US012717287B2

(12) United States Patent
Furth

(10) Patent No.: US 12,717,287 B2
(45) Date of Patent: Aug. 25, 2026

(54) METHOD OF INTEGRATING A FUNCTION BLOCK WITH ARTIFICIAL INTELLIGENCE

(71) Applicant: Schneider Electric Industries SAS, Rueil-Malmaison (FR)

(72) Inventor: Sebastian Furth, Großrinderfeld (DE)

(73) Assignee: Schneider Electric Industries SAS, Rueil-Malmaison (FR)

( * ) Notice: Subject to any disclaimer, the term of this patent is extended or adjusted under 35 U.S.C. 154(b) by 557 days.

(21) Appl. No.: 18/209,525

(22) Filed: Jun. 14, 2023

(65) Prior Publication Data

US 2024/0142918 A1 May 2, 2024

(30) Foreign Application Priority Data

Jun. 15, 2022 (EP) .................................... 22305875

(51) Int. Cl.
*G05B 13/02* (2006.01)

(52) U.S. Cl.
CPC ................................ *G05B 13/0265* (2013.01)

(58) Field of Classification Search
CPC ................................................. G05B 13/0265
USPC ........................................................ 717/160
See application file for complete search history.

(56) References Cited

U.S. PATENT DOCUMENTS 12,474,892 B2* 11/2025 Carrara ..................... G06F 8/33
2018/0293517 A1* 10/2018 Browne ................. G06N 3/105
2018/0314225 A1* 11/2018 Bisse ..................... G05B 19/05
2020/0310394 A1 10/2020 Wouhaybi et al.
2021/0089354 A1 3/2021 Nixon et al.
2021/0397171 A1* 12/2021 Sayyarrodsari .. G05B 19/41885
2022/0222623 A1* 7/2022 Stump .................. G06Q 10/067
2022/0342377 A1* 10/2022 Wang .................. G06N 3/0442
2022/0397875 A1* 12/2022 Mayer .................. G06F 9/4484

FOREIGN PATENT DOCUMENTS

DE 102018216456 A1 3/2020
DE 102020124484 A1 3/2021
EP 2169599 A1 3/2010
EP 3671571 A1 6/2020

(Continued)

OTHER PUBLICATIONS

Rabelo, Luis Carlos, and Sema Alptekin. "Integrating scheduling and control functions in computer integrated manufacturing using artificial intelligence." Computers & Industrial Engineering 17.1-4 (1989): pp. 101-106. (Year: 1989).*

(Continued)

*Primary Examiner* — Satish Rampuria
(74) *Attorney, Agent, or Firm* — Kinney & Lange, P.A.

(57) ABSTRACT

The invention relates to a method of integrating at least one AI function block, which comprises artificial intelligence, into a controller for an industrial machine. In the method, for the AI function block, an AI model is selected for execution in the AI function block, the AI function block is linked in an at least partly automated manner to further function blocks of control software of the industrial machine and the AI function block is brought to execution in an at least partly automated manner, wherein the execution of the AI function block takes place by means of an IEC 61499 runtime environment.

15 Claims, 4 Drawing Sheets

(56) References Cited

FOREIGN PATENT DOCUMENTS

Figure 1:
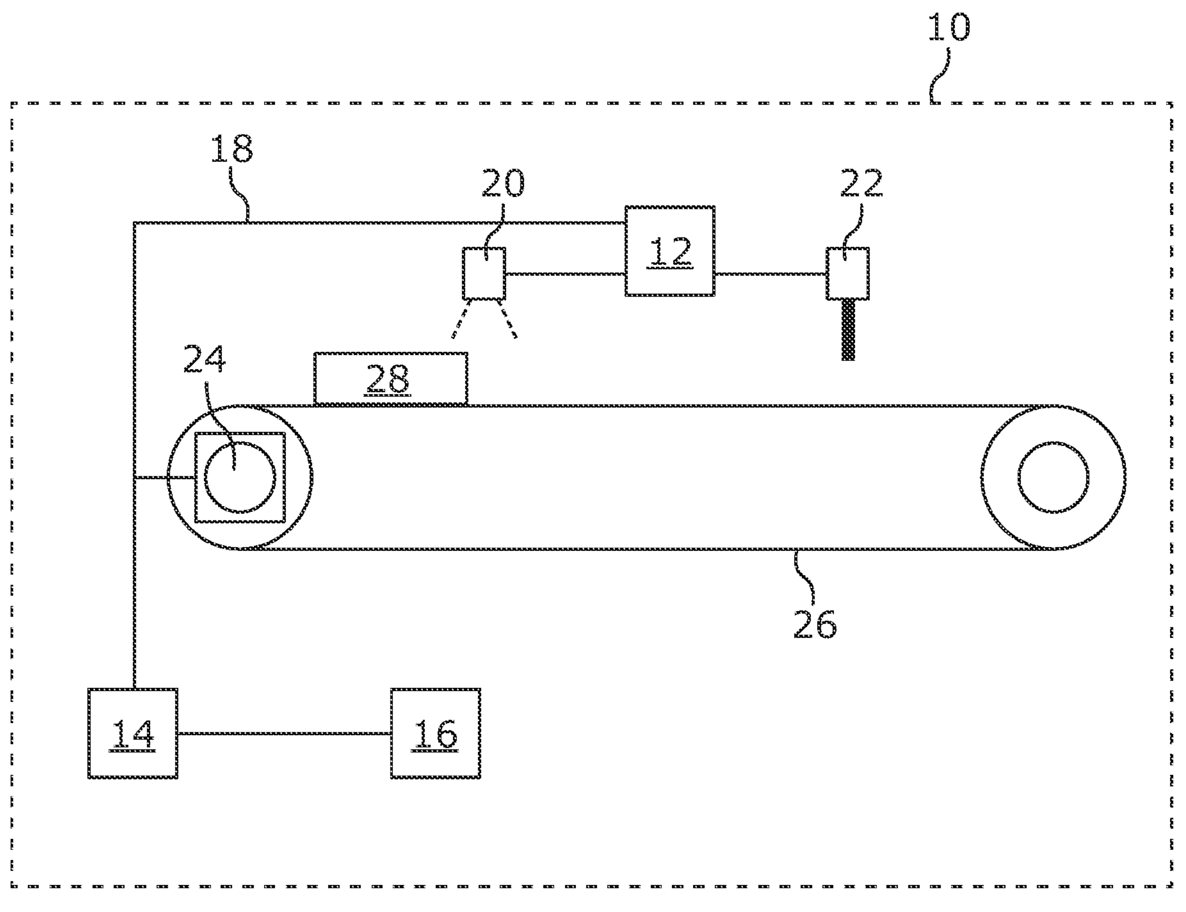

| | | | |
|---|---|---|---|
| WO | 2020040721 | A1 | 2/2020 |
| WO | 2021076093 | A1 | 4/2021 |

OTHER PUBLICATIONS

Ali, Methaq A., Abbas H. Miry, and Tariq M. Salman. "Implementation of artificial intelligence in controlling the temperature of industrial panel." Journal of Engineering and Sustainable Development 25.1 (2021): pp. 92-99. (Year: 2021).*

Guh, Ruey-Shiang. "Integrating artificial intelligence into on-line statistical process control." Quality and reliability engineering international 19.1 (2003): pp. 1-20. (Year: 2003).*

Vyatkin, Valeriy. "IEC 61499 as enabler of distributed and intelligent automation: State-of-the-art review." IEEE transactions on Industrial Informatics 7.4 (2011): pp. 768-781. (Year: 2011).*

Vrba, Pavel, et al. "Rockwell automation's holonic and multiagent control systems compendium." IEEE Transactions on Systems, Man, and Cybernetics, Part C (Applications and Reviews) 41.1 (2010): pp. 14-30. (Year: 2010).*

Lyu, Guolin. "Multi-Agent Modelling of Industrial Cyber-Physical Systems for IEC 61499 Based Distributed Intelligent Automation." ( 2023). pp. 1200-206. (Year: 2023).*

Extended European Search Report dated Dec. 6, 2022 for corresponding European Patent Application No. 22305875.1-1205, 10 pages.

Lyu, Guolin et al., "Towards IEC 61499-Based Distributed Intelligent Automation: A Literature Review," IEEE Transactions on Industrial Informatics, vol. 17, No. 4, Apr. 2021, pp. 2295-2306.

* cited by examiner

METHOD OF INTEGRATING A FUNCTION BLOCK WITH ARTIFICIAL INTELLIGENCE

The present invention relates to a method of integrating at least one AI function block, which comprises artificial intelligence, into a controller for an industrial machine.

It is generally known to use so-called artificial intelligences, i.e. machine learning methods, neural networks, support vector machines (SVMs) and the like, in industrial processes. However, such use does not occur by default.

Therefore, high hurdles often arise for the use of artificial intelligence in industrial controls. Thus, many different architectures exist for such artificial intelligences that can be implemented in different programming languages and with different interfaces. Due to the many variants, incompatibilities can easily arise when integrating and/or executing artificial intelligence in an industrial controller. Therefore, the integration of an artificial intelligence usually requires a high effort.

It is therefore the underlying object of the invention to provide a method that simplifies and accelerates the integration of an artificial intelligence into the controller of an industrial machine.

This object is satisfied by a method in accordance with claim 1.

In the method in accordance with the invention, for the AI function block, an AI model is selected for execution in the AI function block, e.g. from a plurality of AI models. Furthermore, the AI function block is linked in an at least partly automated manner to further function blocks of control software of the industrial machine. Finally, the AI function block is brought to execution in an at least partly automated manner, wherein the execution of the AI function block preferably takes place by means of an IEC 61499 runtime environment.

The invention thus provides a method which is automated to a large extent and in which an operator e.g. only has to specify that an AI function block is required at all, which AI model is to be executed in the AI function block, and how the AI function block is to be connected to the further function blocks. The operator thus only requires a few clicks until the AI function block is functionally integrated into the control software of the industrial machine and can be executed. The operator in particular does not need any knowledge of the software libraries (AI inference engines) required to execute the AI model. Furthermore, the operator also does not have to deal with the configuration of the communication between the AI model and the control software.

Control tasks that can be improved or facilitated by artificial intelligence can thus be integrated into the control software with little effort. The time duration until operability is considerably reduced in this respect, whereby changes to existing machines can, for example, take place much more quickly, whereby production downtimes are reduced again. A reduction in time is also achieved when setting up new industrial machines, whereby the time to market can be reduced.

The controller of the industrial machine can be, for example, a plurality of computing devices (PLCs, computers, etc.) that are connected by means of a data network and that together effect the control of the industrial machine. The various computing devices can in this respect execute the functions predefined by the function blocks.

The industrial machine can comprise a plurality of field devices, such as sensors and actuators. The field devices and the computing devices can be connected to one another via the data network, wherein the data network can preferably be a field bus (e.g. Sercos III, EtherCAT, EIP and the like). The cooperation of the computing devices is in particular based on IEC 61499, as will be explained in more detail later. The function blocks are preferably executed on distributed computing devices. Furthermore, the function blocks can communicate with one another on an event-based basis.

The control software can be divided into function blocks, wherein the connections or links between the function blocks are defined during the configuration of the control software so that a desired control behavior of the control software results. At least one of the function blocks can be configured as an AI function block that is configured to execute the AI model. The AI model can, for example, comprise a neural network, a machine learning algorithm, a support vector machine (SVM) and the like. Furthermore, the AI model can also comprise AI variants outside the machine learning domain, for example rule-based AI systems, AI systems based on logic reasoning, planning and optimization algorithms, search algorithms, etc. The plurality of applicable AI models is an advantage of the approach described herein since the necessary runtime environment is suitably initialized and brought into communication with the control software.

The AI model can, for example, perform a classification task or perform image processing. The AI model can, for example, be configured to check parts manufactured in the industrial process for their correct shape and/or arrangement and can output a corresponding result. The AI function block can therefore, for example, be linked to further function blocks that transfer the images to be evaluated to the AI function block and that further process the calculation result of the AI function block.

The AI model can in particular be an already trained model that is ready for productive use.

The linking of the function blocks can, for example, comprise graphically connecting the function blocks in a graphical user interface, for example, by graphical elements that in particular display a connection of an output of one function block to an input of other function blocks. If such a connection is graphically generated by an operator, the communication interfaces can be automatically created to then create an actual data connection between the respective function blocks.

The linking can likewise comprise a link at the code level, in particular by setting input and output variables, for example in a source code. The AI function block is thus integrated into the controller of the industrial machine. Generally speaking, the AI function block can therefore receive and evaluate sensor data (measured values, image data and the like). Furthermore, the calculation results generated by the AI function block can be used for the control of the actuators of the industrial process.

Due to the linking of the function blocks, it is in particular defined via which data interfaces the function blocks exchange data, events and the like. Furthermore, it can be defined which function blocks communicate with which other function blocks. The function blocks can together form at least a part of the control software of the industrial machine.

As will be explained in more detail later, it can e.g. be automatically recognized which inputs and outputs are required by the AI model and thus by the AI function block, whereby the link to the further function blocks can then be accordingly (automatically) adapted.

The at least partly automated bringing to execution of the AI function block can comprise a deployment. As will be stated in more detail in the following, the executing computing device (i.e. the compute host) can for this purpose be determined, in particular automatically determined, wherein the AI function block is then brought to execution on the executing computing device. In accordance with the invention, the execution of the AI function block in this respect takes place by means of an IEC 61499 runtime environment or in an IEC 61499 runtime environment (RTE).

The runtime environment in accordance with IEC 61499 in particular comprises the capability that an application (i.e. the AI function block and/or the further function blocks or a network of function blocks) can be distributed across a plurality of computing devices (compute hosts). A separate IEC 61499 runtime environment runs on each compute host. The necessary communication ("cross-communication") between the runtime environments is preferably automatically generated by the runtime environments in accordance with IEC 61499.

For example, this means that an IEC 61499 runtime environment is initialized on the most suitable compute host. In this runtime environment, only a single function block is then e.g. executed, in particular the AI function block. In addition to the IEC 61499 runtime environment, a runtime environment for the AI model is also set up on this compute host, in particular automatically. When automatically setting up the runtime environment for the AI model, it is ensured that the runtime environment matches the AI model, e.g. TensorFlow or ONNX can be used for neural networks or an mlpack library can be used for machine learning models. The two runtime environments on the same compute host can then exchange data very efficiently with one another to meet real-time requirements, among other things.

IEC 61499 is an event-based programming language (Event Driven Language). An IEC 61499 runtime environment allows the execution of the control software on various distributed hardware resources, for example PLCs and/or Linux and/or Windows devices. For each function block in the IEC 61499 runtime environment, the executing hardware and/or the executing computing device can be determined individually. In this way, some function blocks can, for example, be executed on a Linux system, whereas other function blocks can be executed on a Windows system.

Due to the use in accordance with the invention of the IEC 61499 runtime environment, the AI function block can be flexibly integrated into a distributed architecture of computing devices, wherein the AI function block can thereby be easily executed on a suitable computing device (e.g. with sufficient computing power). It is furthermore ensured by the IEC 61499 runtime environment that the communication between the AI function block and the further function blocks of the control software (on other computing devices, if necessary) automatically takes place correctly. The communication can in this respect take place via the aforementioned data network.

Further embodiments of the invention can be seen from the description, from the dependent claims, and from the drawings.

In accordance with a first embodiment, the AI function block and/or the further function blocks are function blocks in accordance with IEC 61499. This in particular means that the function blocks can be activated by events and can also generate events themselves to activate other function blocks. The function blocks and in particular the AI function block appear, at least externally, as IEC 61499 function blocks. The internal structure of the AI function block will be described in more detail below.

In accordance with a further embodiment, the AI function block comprises a runtime container, which provides the IEC 61499 runtime environment, and an AI container in which the artificial intelligence is executed, wherein the runtime container and the AI container communicate with one another. Generally speaking, the AI function block can thus be executed in a virtualized environment.

The runtime container preferably provides data interfaces to the further function blocks. Due to the communication of the runtime container with the AI container, it is preferably made possible to execute the AI functions. In the AI container, the AI model is executed. In this respect, the advantage in particular results that, due to the communication of the AI container with the IEC 61499 runtime environment, the communication with the further function blocks can automatically take place in a data format that is also suitable for the further function blocks (which are configured in accordance with IEC 61499, for example). Due to the provision of the IEC 61499 functionality by the runtime container, the functionality of the AI model is directly integrated at the control code level, i.e. directly integrated into the control software.

The runtime container preferably executes a virtual IEC 61499 runtime environment. Depending on the selected AI model, the respective required AI container can be determined, preferably automatically. The AI container in this respect provides the "inference environment" for the AI model. Different AI containers can in particular be required depending on whether the AI model was, for example, created in PyTorch, ONNX, KERAS, Tensorflow and the like. The AI container and/or the runtime container can, for example, be a Docker container, an LXC container, a containerd container and the like.

The required AI container can first be preselected based on the AI model. Thus, an AI container having a suitable framework (e.g. Tensorflow, PyTorch, or ONNX) can be preselected for an AI model that is a neural network. On the other hand, for an AI model having a machine learning model (e.g. SVM), an AI container having a framework based on "mlpack" can be preselected instead. In a second step, an AI container having the appropriate version of the framework (e.g. Tensorflow 1 or Tensorflow 2) can then be selected and used.

A collection of AI containers that preferably encapsulate the corresponding runtime environment is in particular available, wherein the most suitable AI container is selected based on the AI model. It is hereby possible to automatically bring a wide variety of AI models to execution. A restriction e.g. only to neural networks in Tensorflow 1 can be omitted.

In accordance with a further embodiment, the control software is executed on a plurality of different computing devices connected by means of a data network, wherein one of the computing devices is selected in an automated manner for the execution of the AI function block, for example based on the available computing power of the computing device. In accordance with the method, it can therefore be checked which of the computing devices is most suitable for the execution of the AI function block. In addition to the available computing power of the computing device, alternatively or additionally, the presence of specific hardware set up for the execution of machine learning methods in the computing device can also be decisive, for example. After the selection of the computing device (i.e. the compute host), an initialization on the selected computing device takes place. In this respect, a so-called POD can be formed that comprises a plurality of containers. The AI container and the runtime container can in particular be jointly initialized on the computing device.

In accordance with a further embodiment, the runtime container and the AI container are automatically initialized on the selected computing device. The runtime container and the AI container are preferably the same computing device.

In accordance with a further embodiment, after the initialization of the AI container, a deployment, preferably an automatic deployment, of the selected AI model into the AI container takes place. Alternatively or additionally, after the initialization of the runtime container, a deployment, in particular an automatic deployment, preferably of an instance, of the runtime container to the selected computing device takes place. In particular the semi-automated or fully automated installation and configuration of software (here of the AI container and/or the runtime container) is designated as deployment (software distribution) here.

In accordance with a further embodiment, the AI container and the runtime container are executed on the same hardware and in particular communicate directly via the common hardware, for example via jointly used memory areas. The communication on the same hardware can thus take place in a very fast and low-latency manner, whereby the function of the artificial intelligence can be accelerated.

In accordance with a further embodiment, the communication interfaces between the AI container and the runtime container are automatically configured. In particular, for the configuration of the communication interfaces between the AI container and the runtime container, the inputs and the outputs of the AI model are determined, preferably automatically determined, and the communication interfaces between the AI container and the runtime container are adapted to the inputs and the outputs. If it is, for example, determined that the AI model requires a plurality of different inputs having different data types, but the AI model provides only one output of a single data type, the runtime container can provide communication interfaces (i.e. data interfaces) via which the AI model can be provided exactly with the required inputs and via which the result determined by the AI model can be retrieved at the output.

Furthermore, the runtime container can provide the inputs and outputs required by the AI model to external, i.e. for the further function blocks. In the present example, the AI function block would then comprise a plurality of inputs having the different data types and the one output mentioned. The inputs and outputs of the AI function block are then available to the further function blocks for linking. The automatically determined inputs and outputs can in particular be graphically displayed to an operator in a graphical user interface. For example, the inputs and outputs of the AI function block can be determined based on information, in particular based on meta-data, of the AI model. The meta-data can, for neural networks, e.g. comprise the “input shapes” and “output shapes”, i.e. the dimensions of the tensors/matrices of the inputs and outputs.

In accordance with a further embodiment, the method is initiated by an operator, wherein the operator first selects an AI function block and then selects the AI model, in particular in the form of an executable file or a binary file, for the AI function block. The operator can then additionally initiate the deployment. Overall, it can thus only be necessary to perform three steps (selecting the AI function block, selecting the AI model, and initiating the deployment). The operator can be graphically guided in a graphical user interface by these three steps. In this respect, the operator can then graphically select the AI function block in the first step. In the second step, the operator can select the AI model, for example by selecting it from a drop-down list or by specifying a file comprising the AI model. By selecting an executable file and/or a binary file, the AI model can be executed directly in the AI function block without requiring a compilation, for example. In the last step, the operator can then initiate the deployment, whereupon the computing device is then automatically selected and the function block is executed on the computing device. The aforementioned steps can be displayed to the operator, in particular by an engineering system. The engineering system can be software and/or hardware for configuring and programming the computing devices of the industrial machine. The engineering system can perform the configuration of the computing devices in accordance with IEC 61499.

A further subject of the invention is an industrial machine that is configured

- to enable a selection of an AI model for an AI function block, wherein the AI model is executed in the AI function block,
- to link the AI function block in an at least partly automated manner to further function blocks of control software of the industrial machine,
- to bring the AI function block to execution in an at least partly automated manner, wherein the execution of the AI function block takes place by means of an IEC 61499 runtime environment.

The aforementioned functions of the industrial machine can, for example, be provided by an engineering system that can be part of the industrial machine. The engineering system can in particular comprise a computing device that is at least temporarily connected to the industrial machine via a data network.

In accordance with an embodiment of the industrial machine, the industrial machine comprises a plurality of computing devices, wherein different computing devices execute different ones of the further function blocks and the function blocks communicate with one another in accordance with IEC 61499. The functions of the industrial machine are therefore preferably controlled by means of distributed hardware.

Finally, the invention also relates to a computer program product comprising commands that, on the execution of the program by a computer (or by one or more of the aforementioned computing devices), cause the computer or said computing devices to perform the method described herein.

The statements on the method in accordance with the invention apply accordingly to the industrial machine in accordance with the invention and the computer program product in accordance with the invention. This in particular applies with respect to advantages and preferred embodiments. It is understood that all the embodiments and features mentioned herein can be combined with one another, unless explicitly stated otherwise.

Figure 2:
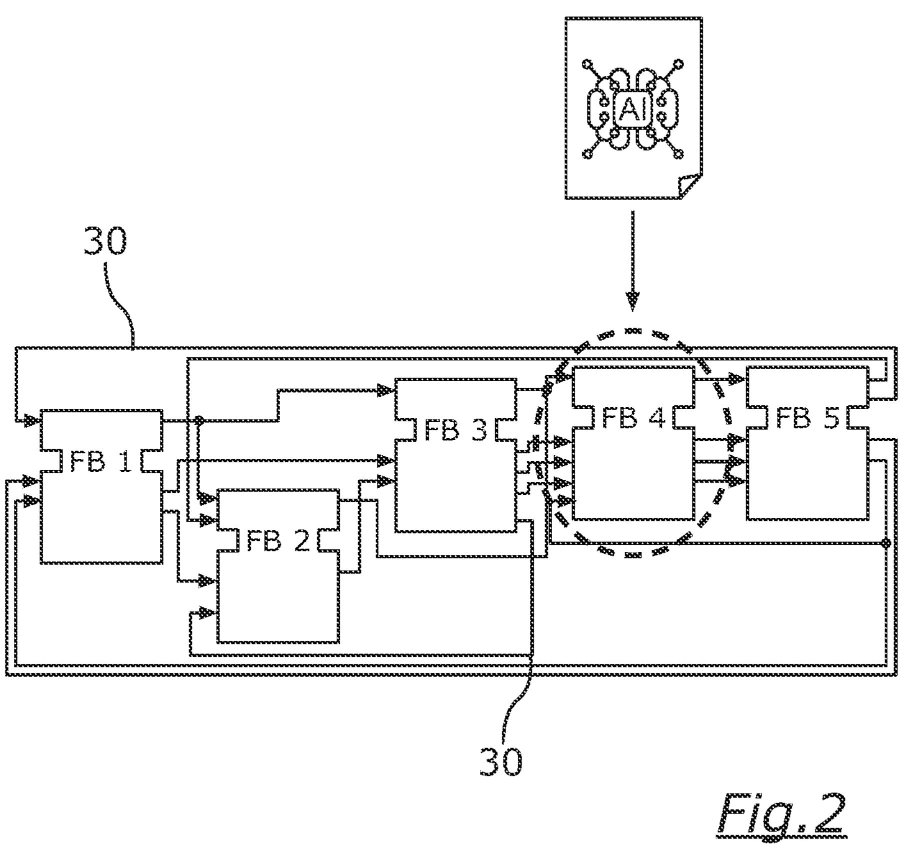
Figure 3:
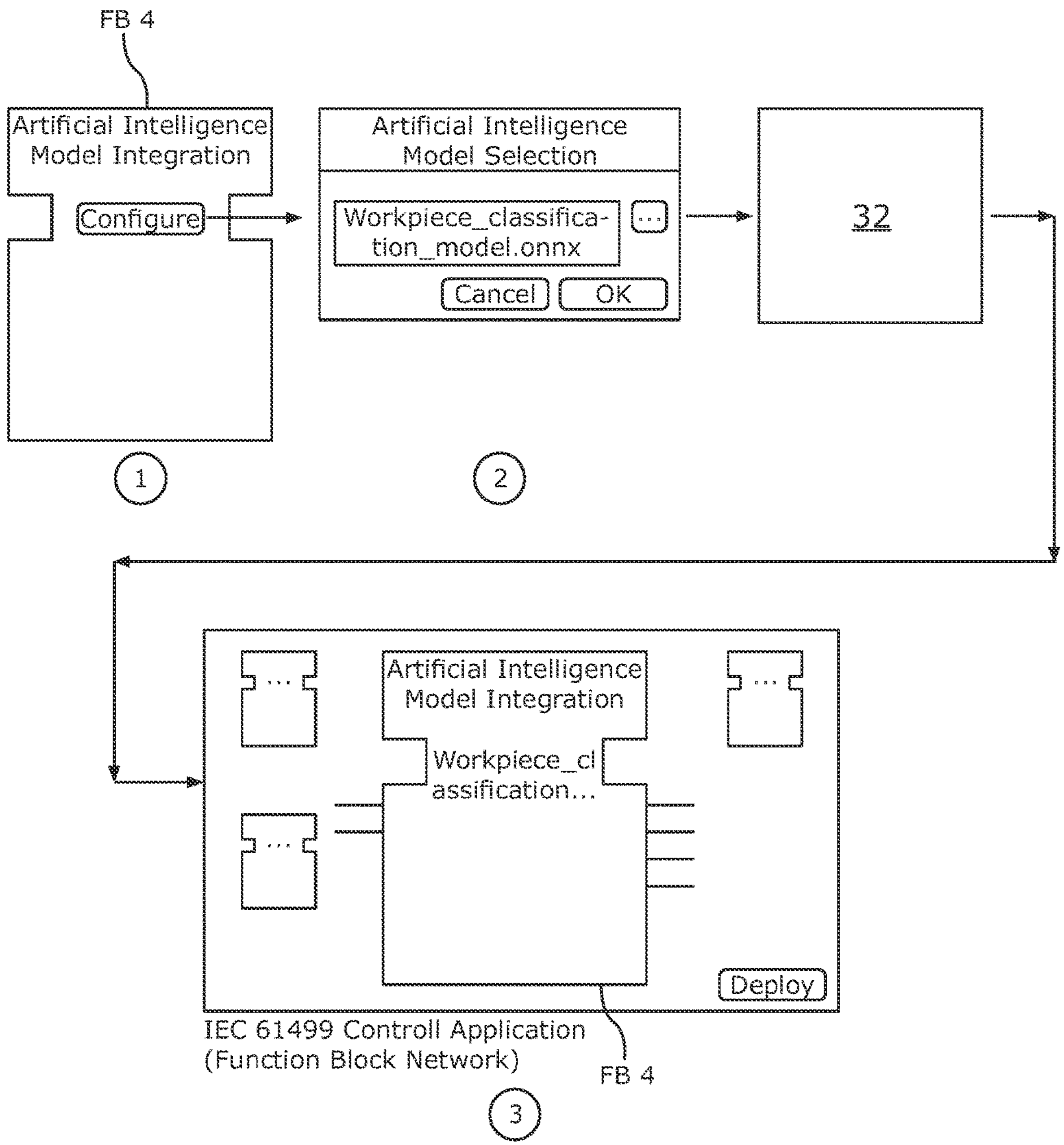
Figure 4:
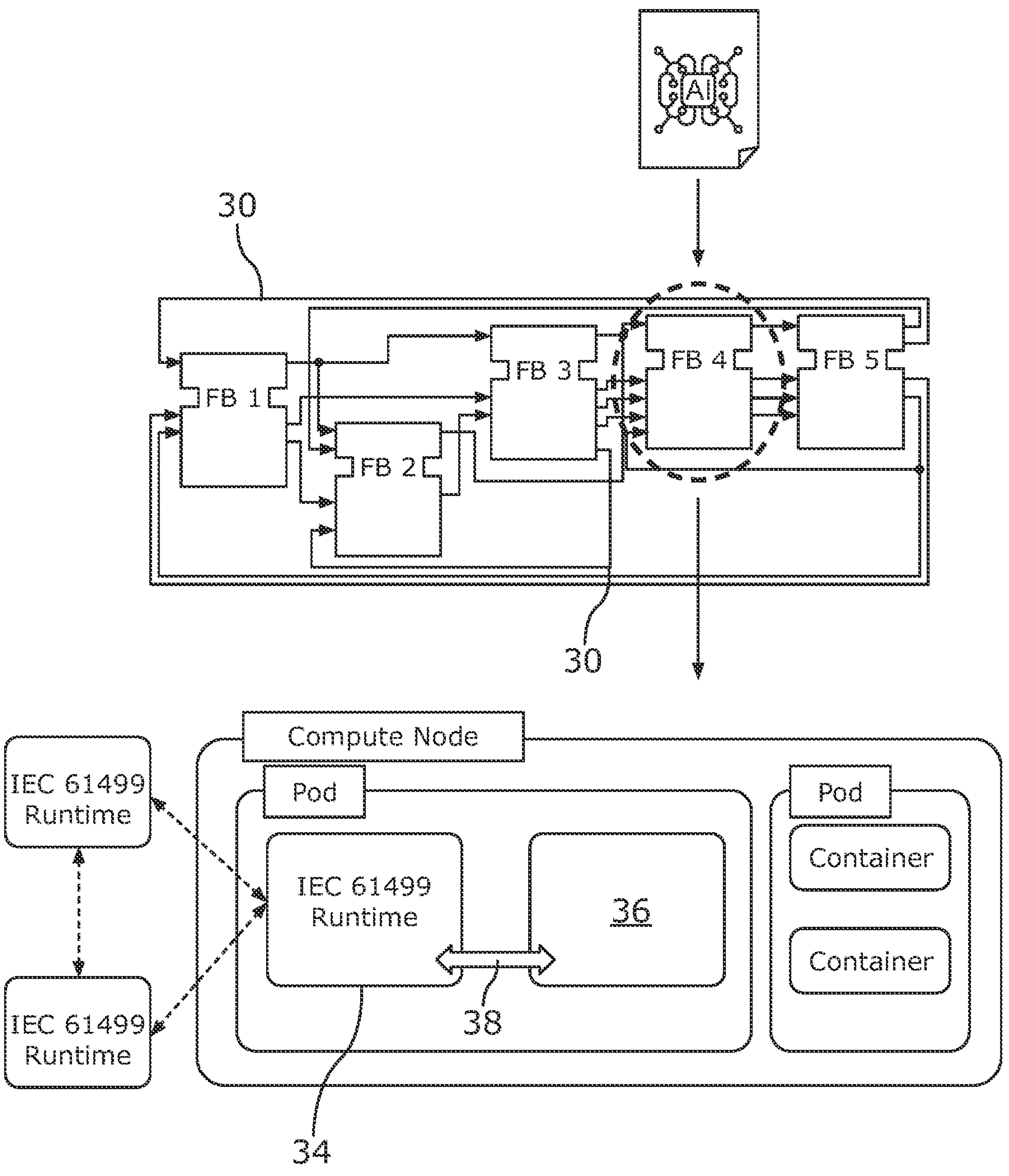

The invention will be described purely by way of example with reference to the drawings in the following. There are shown:

FIG. 1 a schematic view of an industrial machine comprising a plurality of computing devices;

FIG. 2 function blocks linked to one another for controlling the industrial machine;

FIG. 3 steps for integrating artificial intelligence into a function block;

FIG. 4 schematically, the execution of an AI function block on a computing device.

FIG. 1 shows an industrial machine 10. The industrial machine 10 comprises three computing devices 12, 14, 16.

The computing devices 12,14 can, for example, be designed as programmable logic controllers (PLCs), whereas the computing device 16 can be designed as a Windows device comprising an engineering system.

The computing devices 12, 14, 16 are connected to one another by means of a data network 18 in the form of a fieldbus. The industrial machine 10 furthermore comprises a camera 20, a gripper 22, and a motor 24 of a conveyor belt 26. The field devices 20, 22, 24 are likewise connected to the data network 18. Workpieces 28 to be processed by the industrial machine 10 can be transported by the conveyor belt 26.

The workpieces 28 are in this respect recorded by the camera 20. Based on the images recorded by the camera 20, defective workpieces 28 are to be recognized and sorted out by means of the gripper 22.

An engineering system, which allows the programming and configuration of the field devices 20, 22, 24, is executed on the computing device 16. The engineering system also defines which of the computing devices 12, 14, 16 performs which parts of the programming and configuration.

In FIG. 2, a view is schematically shown as it is also displayed to an operator of the engineering system. The view shows different function blocks FB1-FB5. The function blocks FB1-FB5 are connected to one another by graphical connectors 30. The graphical connectors 30 indicate how outputs of one function block are linked to inputs of another function block.

The function blocks can perform different tasks. For example, the function block FB1 can effect the control of the motor 24 and can thus control the movement of the workpieces 28. Via the graphical connectors 30, an operator can specify that outputs of a function block forward information to other function blocks. For example, after the movement of a workpiece 28, the function block FB1 can inform the function block FB3 that a workpiece 28 is now present in the region of the camera 20. The function block FB3 can then instruct the camera 20 to record an image of the workpiece 28. The image of the camera 20 can then be transmitted to the function block FB4.

In the function block FB4, an artificial intelligence ("AI" in FIG. 2 and FIG. 4) is now to be executed to evaluate the images generated in the function block FB3.

FIG. 3 now shows the steps which an operator can perform to configure the function block FB4 into an AI function block and to start the execution of the AI function block. In the first step, the operator selects an AI function block. By clicking on "Configure", a binary file comprising the AI model can then be selected in the second step. In the present example, a file is selected for the classification of the workpieces 28 ("Workpiece_classification_model.onnx"). After the selection, an automatic adaptation 32 takes place in which the inputs and outputs of the AI model are determined and the inputs and outputs of the AI function block are adapted accordingly. Finally, in the third step, the operator can bring the AI function block to execution by clicking on "Deploy".

As a result, as shown in FIG. 4, a pod of two containers, namely a runtime container 34 and an AI container 36, is, for example, created on the computing device 12. The containers 34, 36 communicate by means of shared memory areas 38.

Even further containers can also be executed in another pod on the computing device 12. The runtime container 34 communicates with further runtime environments via the data network 18. Both the runtime container 34 and the further runtime environments that execute the further function blocks FB1, FB2, FB3 and FB5 operate in accordance with IEC 61499.

In operation, the further function blocks FB1, FB2, FB3 and FB5 can, for example, transmit image data of the camera 20 to the AI function block FB4. There, the runtime container 34 receives the data and transmits them to the AI container 36 via the jointly used memory area. In the AI container 36, the AI model performs a classification. Once the classification is completed, the classification result is transmitted via the runtime container 34 to the further function blocks FB1, FB2, FB3 and FB5. The further function blocks can then, for example, determine based on the classification whether the gripper 22 is to sort out a workpiece 28.

Overall, it is thus possible for an operator to integrate a complex AI model into the controller of the industrial machine 10 with just a few clicks.

REFERENCE NUMERAL LIST

10 industrial machine
12 computing device
14 computing device
16 computing device
18 data network
20 camera
22 gripper
24 motor
26 conveyor belt
28 workpieces
30 graphical connector
32 automatic adaptation
34 runtime container
36 AI container
38 jointly used memory area
FB1 function block
FB2 function block
FB3 function block
FB4 AI function block
FB5 function block

The invention claimed is:

1. A method of integrating at least one artificial intelligence (AI) function block, which comprises artificial intelligence, into a controller for an industrial machine, wherein, in the method, for the AI function block, an AI model is selected for execution in the AI function block, the AI function block is linked in an at least partly automated manner to further function blocks of control software of the industrial machine, the AI function block is brought to execution in an at least partly automated manner, wherein the execution of the AI function block takes place by means of an IEC 61499 runtime environment; and the AI function block and the further function blocks are function blocks in accordance with IEC 61499;

wherein:

the AI function block comprises:

a runtime container, which provides the IEC 61499 runtime environment, and an AI container in which the artificial intelligence is executed, wherein the runtime container and the AI container communicate with one another;

the communication interfaces between the AI container and the runtime container are automatically configured;

for the configuration of the communication interfaces between the AI container and the runtime container, the inputs and the outputs of the AI model are determined and the communication interfaces between the AI container and the runtime container are adapted to the inputs and outputs;

the control software is executed on a plurality of different computing devices connected by means of a data network; and one of the computing devices of the plurality of different computing devices is selected in an automated manner for the execution of the AI function block.

2. The method in accordance with claim 1, wherein the runtime container and the AI container are automatically initialized on the selected computing device.

3. The method in accordance with claim 2, wherein, after the initialization of the AI container, a deployment of the selected AI model into the AI container takes place and, after the initialization of the runtime container, a deployment of the runtime container to the selected computing device takes place.

4. The method in accordance with claim 3, wherein the deployment is an automatic deployment.

5. The method in accordance with claim 4, wherein the deployment is an automatic deployment of an instance.

6. The method in accordance with claim 1, wherein the AI container and the runtime container are executed on the same hardware and communicate directly via the common hardware.

7. The method in accordance with claim 6, wherein the AI container and the runtime container are executed on the same hardware and communicate directly via the common hardware via jointly used memory areas.

8. The method in accordance with claim 1, wherein the method is initiated by an operator, wherein the operator first selects an AI function block and then selects the AI model for the AI function block.

9. The method in accordance with claim 8, wherein the operator first selects an AI function block and then selects the AI model in the form of an executable file or a binary file, for the AI function block.

10. The method in accordance with claim 1, wherein said one of the computing devices is selected in an automated manner for the execution of the AI function block based on the available computing power of the computing device.

11. The method in accordance with claim 1, wherein the inputs and the outputs of the AI model are automatically determined.

12. The method of claim 1, wherein different computing devices of the plurality of different computing devices execute different ones of the further function blocks.

13. An industrial machine that is configured to enable a selection of an artificial intelligence (AI) model for an AI function block, wherein the AI model is executed in the AI function block, to link the AI function block in an at least partly automated manner to further function blocks of control software of the industrial machine, to bring the AI function block to execution in an at least partly automated manner, wherein the execution of the AI function block takes place by means of an IEC 61499 runtime environment;

wherein:

the AI function block and the further function blocks are function blocks in accordance with IEC 61499;

the AI function block comprises:

a runtime container, which provides the IEC 61499 runtime environment, and an AI container in which the artificial intelligence is executed, wherein the runtime container and the AI container communicate with one another;

the communication interfaces between the AI container and the runtime container are automatically configured;

for the configuration of the communication interfaces between the AI container and the runtime container, the inputs and the outputs of the AI model are determined and the communication interfaces between the AI container and the runtime container are adapted to the inputs and outputs;

the industrial machine comprises a plurality of different computing devices;

the control software is executed on the plurality of different computing devices connected by means of a data network; and one of the computing devices of the plurality of different computing devices is selected in an automated manner for the execution of the AI function block.

14. The industrial machine in accordance with claim 13, wherein the industrial machine comprises a plurality of computing devices, wherein different computing devices execute different ones of the further function blocks and the function blocks communicate with one another in accordance with IEC 61499.

15. The industrial machine of claim 13, wherein different computing devices of the plurality of different computing devices execute different ones of the further function blocks.

* * * * *